June 14, 1966   M. A. GROENKE   3,255,830
CULTIVATING APPARATUS WITH SIDE SECTION LIFT
Filed Oct. 7, 1964   2 Sheets-Sheet 2
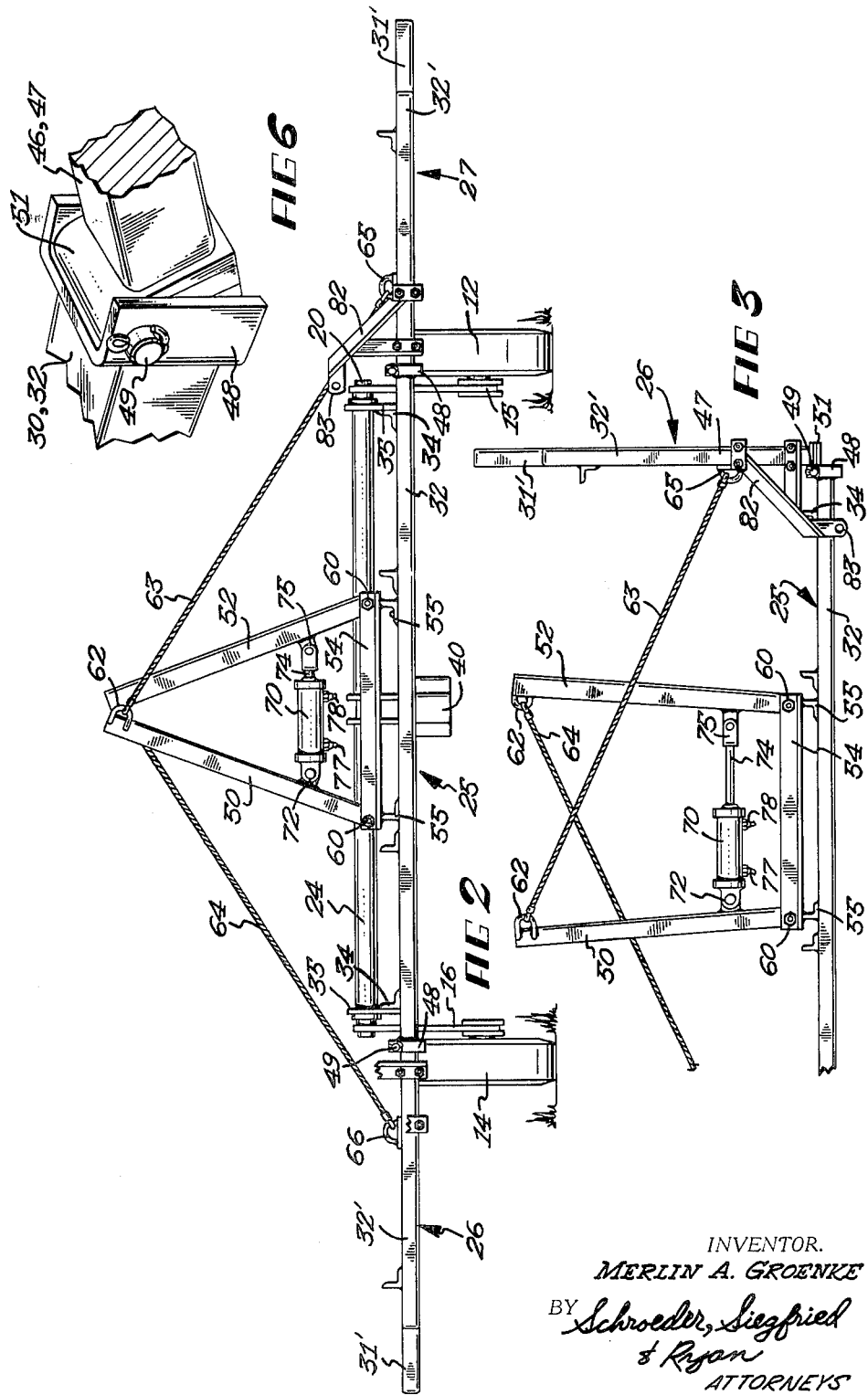
INVENTOR.
MERLIN A. GROENKE
BY Schroeder, Siegfried
& Ryan
ATTORNEYS

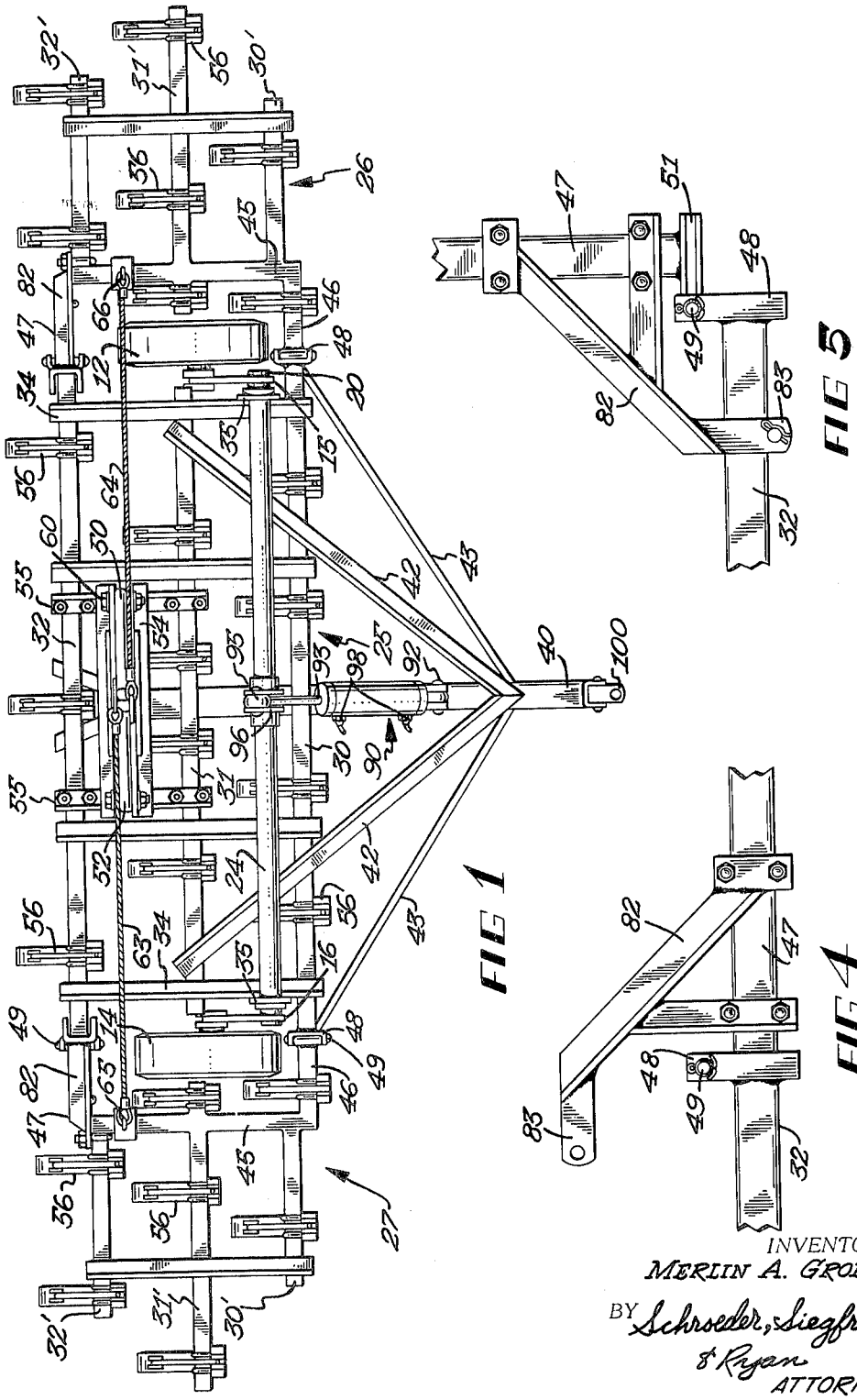

United States Patent Office 3,255,830
Patented June 14, 1966

3,255,830
CULTIVATING APPARATUS WITH SIDE SECTION LIFT
Merlin A. Groenke, Glencoe, Minn., assignor to Portable Elevator Manufacturing Company, Bloomington, Ill., a corporation of Illinois
Filed Oct. 7, 1964, Ser. No. 402,188
1 Claim. (Cl. 172—456)

This invention relates generally to the field of farm implements and more particularly to cultivating type apparatus whose physical size is normally difficult to transport. This improved cultivating apparatus utilizes a plurality of sectional components, the end sections of which fold up for transportation purposes and provides an improved lift structure for such cultivating apparatus.

While harrows, cultivators, and the like have been made in sections previously, and provision has been made for folding sections of such implements on one another, the prior structures have been generally complex in design so as to increase the cost of the same and provide difficulty in the usage of the same. The present improved cultivating apparatus provides a sectional cultivator which is readily mounted on a wheel carrier or support such as to be towed or carried by a single power unit, such as a tractor, and with simplified provision for raising the end sections thereof to reduce the width of the same when not in use.

It is therefore the primary object of this invention to provide an improved cultivating apparatus of the side lift type.

Another object of this invention is to provide in an improved cultivating apparatus a simplified support structure for sectional components of the same an improved means for lifting the sectional components to a raised position for transportation and storage purposes.

A further object of this invention is to provide an apparatus of this type which is simplified in design, reduced in cost and is easy to use.

These and other objects of the present invention will become apparent from a reading of the attached description together with the drawings wherein:

FIGURE 1 is a plan view of the improved cultivating apparatus,

FIGURE 2 is a rear elevation view of the improved cultivating apparatus with the cultivating tools removed for simplicity, FIGURE 3 is a broken section view of the cultivating apparatus in a raised position, FIGURE 4 is a sectional view of the stop structure for the improved cultivating apparatus in one operative position, FIGURE 5 is a sectional view of the stop structure of FIGURE 4 in a second operative position, and FIGURE 6 is a sectional view of the hinge structure of the improved cultivating apparatus.

The improved cultivating apparatus of the present invention is of the type which utilizes hinged or pivoted side or end extensions to increase the width of the same for cultivating purposes and in which the extensions fold to reduce the size of the cultivating apparatus during storage and transportation conditions. Thus in FIGURE 1, the improved cultivating apparatus is shown in plan view in the extended position and in FIGURE 2 in a rear elevation view in an extended position. For simplicity, the cultivating tools normally attached to the cultivating apparatus are omitted from the drawing except for a limited showing of several tools mounted on the frame in the plan view to indicate the arrangement of parts. Since the present invention is directed only to the structural features of the hinged lift for the wing or side sections of the cultivating apparatus and the details of the cultivating tools and their mounting form no part of the present invention, they are not included in the remaining drawings.

Thus in FIGURE 1, the improved cultivating apparatus is shown as mounted on a support structure which is formed by a pair of wheels 12 and 14 connected through suitable linkages 15 and 16 to a transversely extending support bar 20 which is housed in an enclosing tube structure 24. Thus the support structure for the cultivating apparatus for the wheeled support for the same includes basically the wheels 12, 14 mounted through cantilever type linkages 15 and 16 on a centrally located and transversely extending support bar 20. The remaining portion of the cultivating apparatus is carried by this structure in a raised position for transportation purposes. While I have shown a separate wheeled support structure for a cultivating apparatus, it will be understood that the frame may be of the type which is mounted on and carried by the tractor through a three point hitch. In the lowered position, the cultivating tools engage the surface of the earth, as will be later noted, and the relative position of the remaining structure with respect to the support bar 20 is adjusted to permit such location.

The main body of the cultivating apparatus is a central transverse section, indicated generally at 25, which is supported on the transverse rod 20 through the tubular member 24 and which in turn mounts end sections 26 and 27 to provide for an extension of the cultivating apparatus during normal usage. The central transverse section is generally a rectangular frame formed of a pair of elongated body members 30, 31, and 32 which are suitably connected by a plurality of cross-members 34 which are connected to the elongated members through suitable means, such as welding or nut and bolt connections. This generally rectangular frame includes a pair of flanges 35 on the end tie members 34 which support the tubular sleeve 24 encircling the support rod 20. In addition, the elongated transverse members 30–32 of the central transverse section or frame have connected thereto a beamlike tow bar 40 which is coupled to the elongated bar members 30–32 through suitable means such as welding and which extends to one side of the transverse section in a conventional manner. Suitable tie bars such as indicated at 42 and 43 are welded to the tow bar 40 and extend at an angle thereto to connect to the central transverse frame at or near the outer edges thereof and in differing points to stabilize the transverse frame connection to the tow bar. The end sections 26, 27 are identical in structure and include generally a welded frame type structure 45 of connecting bar members which are generally aligned with the elongated bars 30–32 and which as will be later noted also mount cultivating tools. The structures or frames 45 of the end sections include pivoted extremities 46, 47 respectively which align with journals or couplings 48 at the ends of the bars 30, 32 of the central transverse section or frame to form a hinged structure which is shown in the sectional view in FIGURE 6. This hinge includes a keyed pivot pin 49 which extends through the generally U shaped journals or couplings 48 to the extremities of the bars 30, 32 and mounts a journal section 51 on the extremities 46, 47 of the end sections 26, 27.

As will be seen in FIGURE 1, both the end sections 26, 27 and the central transverse section 25 at the bars 30–32 and the extensions of the same, identified at 30', 31', and 32' in the end sections 26, 27, position a plurality of cultivating tools 56, a number of which are shown in FIGURE 1, which tools are mounted in a staggered relationship to provide a conventional arrangement for a cultivating apparatus. The details of these tools are omitted for simplicity since they may take varying forms. However, they will be generally bolted to the elongated bars 30–32 and 30′–32′ in a conventional manner and will depend therefrom.

The hinge structures at the forward and rearward edges of the transverse central frame 25 and the end sections or frames 26, 27 provide for a stabilized support for the end sections on the transverse section and alignment of the end sections with the central transverse sections such that the tools mounted thereon are generally aligned when the end sections are in a lowered position. The end sections are adapted to be pivoted on the center section to a raised position, such as indicated generally in the sectional view of FIGURE 3, to a position substantially normal to the extent of the central transverse section (see FIGURE 3). The structure for raising and lowering the end sections relative to the central transverse section will best be seen in FIGURES 2 and 3 as including a pair of posts 50, 52 which are pivotally mounted on a frame member 54, the frame member being positioned on a pair of transverse bars 55 which are welded or suitably connected to the elongated bars 31, 32. The posts or supporting structures 50, 52 are pivoted through suitable pivot means indicated at 60 with the free extremities of the posts mounting U bolts or suitable connecting connectors 62 by means of which cables 63, 64 are attached and extend to similar type bolts or coupling members 65, 66 attached to the end frames 45 of the end sections 26, 27. By pivoting the posts or supporting structures 50, 52 on their supporting frames composed of parts 54, 55 which are connected to the central transverse section 25, the extremities of the posts with the cables attached thereto are moved from a position substantially normal to the extent of the transverse center section 25 to an inclined position thereto with the ends of the posts 50, 52 positioned adjacent one another. Because of the location of the tie points 65, 66 of the cables 63, 64 on the end sections 26, 27 the end sections are pivoted from an aligned position to a position substantially normal to the central transverse section 25, as indicated in FIGURE 3.

Connected between the posts or upstanding structures 50, 52 is a hydraulic actuator 70 which is pivotally connected at its cylinder extremity, as at 72, to the post 50 and at its shaft extremity 74 through a turn buckle 75 to the post or upstanding support 52. Suitable pneumatic or hydraulic connections 77, 78 at the extremities of the cylinder provide for fluid flow under pressure to the cylinder to move the shaft 74 into and out of the confines of the cylinder in a conventional manner. The pivotal connections between the cylinder, its shaft and the upstanding support structures 50, 52 provide for pivoting support structures on their pivots 60 relative to the central transverse frame 25. Thus in the expanded or extended position of the shaft 74, as indicated in FIGURE 3, the post or supports are substantially normal to the extent of the transverse section. By directing fluid to the opposite end of the cylinder, the piston or the shaft thereof is withdrawn into the confines of the cylinder moving the pivoted supports or posts 50, 52 toward one another in an inclined position, such as indicated in FIGURE 3. In this inclined position, the cables 63, 64 allow the end sections 26, 27 to be positioned substantially horizontal and aligned with the horizontal extent of the central transverse section 25. As the cylinder is energized with fluid at the opposite side of its motor or actuator, the shaft is extended causing the posts to move to a substantially vertical position and raising the end sections 26, 27 to a position substantially normal to the extent of the central section 25. Although not shown, it will be understood that the hose connections or fluid connections 77, 78 lead along the extent of the tow bar to a fluid supply source, such as is normally located on the motor equipment drawing the cultivating apparatus.

In the raised position of the end sections, as shown in FIGURES 4 and 5 for one end section a suitable stop structure is formed by a flange 82 bolted to the end sections. Flange 82 has an extremity 83 which is adapted to be positioned adjacent the bar type supports 32 of the central frame. In this position, they engage one of the cross members 34 attached to the bars 30, 32 which serves as a stop or rest to hold the end sections 26, 27 in the raised position. An aperture through the extension 83 provides for the insertion of the pin at this point to lock the end sections at a raised position. As will be seen in FIGURE 1, the end sections 26, 27 each have such a stop structure on the rear edge of the same to cooperate with the bar or support member 32 of the transverse section and one of the cross bars 34 thereto.

In addition to the hydraulic actuator 70 for pivoting the posts to raise and lower the end sections of the cultivating apparatus, a second hydraulic actuator, indicated generally at 90, is mounted on the tow bar 40 of the cultivating apparatus, such as indicated at 92, with its shaft extremity 93 connected through a universal pivot 95 and to a connecting flange section 96 common with the inner shaft 20 positioned in support tube 24 of the wheeled support. Suitable fluid connections, such as indicated at 98, provide for transmission of fluid under pressure to this actuator. Through energization of the hydraulic 90, its shaft 93 is extended and the shaft or support rod 20 within the cylinder sleeve 24 connected to the transverse frame is rotated causing the linkages 15 and 16 for the wheels 12 and 14 to be rotated and effecting a raising or elevation of the frame comprised of the central transverse section 25 and the end sections 26, 27 pivoted thereon relative to the ground and the wheeled support. Thus in the nonworking position, the actuator 90 is operated or energized to rotate the support rod 20 with the wheels connected thereto and raise the frames 25, 26, 27 of the cultivating apparatus to raise the cultivating tools clear of the ground and provide for positioning and moving the cultivating apparatus on the wheels 12 and 14. Tow bar 40 includes a pivoted hitch member 100 by means of which the cultivating apparatus may be connected to a suitable motive source, such as a tractor, and the pivoted hitch or clevis permits raising of the frames of the cultivating apparatus relative to the ground and supporting the same on the wheels for transportation purposes. In the working position, the actuator 90 is positioned or actuated such that the rod or support member 20 is rotated to allow the wheels to move up relative to the transverse frame 25 and permit the cultivating tools mounted thereon in addition to the cultivating tools on the end sections 26, 27 to engage the surface of the ground and ride thereon, in a conventional manner.

In operation, the improved cultivating apparatus permits the use of a relatively wide sweep cultivator to be folded or the end sections thereof to be raised in a simplified manner and through a simplified structure for transportation and storage purposes. The end or wing sections 26, 27 of the improved cultivating apparatus are pivoted on the central transverse section to permit movement from a position of alignment with the central transverse section for cultivating purposes to a position substantially normal thereto for transportation and storage purposes. A simplified support and pivoting structure in the form of a pair of pivoted support members 50, 52 pivotally mounted on the central transverse frame and connected to the end sections by force transmitting means or cables 63, 64 apply the motivating force for raising and lowering the end sections. The hydraulic actuator positioned between and pivotally connected to the upstanding support members or posts 50, 52 permits the posts to be moved with expansion and contraction of the actuator or extension or withdrawal of the shaft thereof between limit positions which cause the end sections to be raised or lowered. A stop structure for providing a rest position for the end sections on the central transverse section is shown in the disengaged and engaged positions in FIGURES 4 and 5. Thus in FIGURE 4, the stop member 82 mounted on the end sections 26, 27 will be cleared of the central transverse frame. In the raised position, the downwardly extending flange engages a bar member 34 on the central transverse section. A suitable lock is provided for the stop through a locking pin which is inserted at the extremity of the flange to secure the end sections on the central transverse section in the elevated position. The improved cultivating apparatus permits the supporting structure or the wheeled supports to be pivotally connected to the tool mounting sections or the transverse sections 25 and the end sections 26, 27 such that the central transverse and end sections may be raised relative to the ground for working purposes. In the raised position of the supporting frame 25 with the end sections 26, 27 thereon, the wheels through the linkages 15 and 16 and the support member 20 mount and carry the cultivating apparatus for rolling movement. The pivoted turn buckle or hitch 100 on the tow bar which is attached to the central section 25 permits alignment with the hitch of the towing vehicle for this purpose. In the lowered or working position, the turn buckle permits the tow bar to align with the drawing axis of the towing vehicle such that the working tools will be positioned relative to the ground for maximum efficiency in cultivation.

This improved cultivating apparatus with the side or end section lifts provides a simplified structure for raising and lowering the end sections and securing the same on the main frame of the cultivating apparatus. It further permits the use of a single hydraulic actuator for performing this function simplifying the over all cultivating apparatus.

Therefore, in considering this invention it should be remembered that the present disclosure is intended to be illustrative only and the scope of the invention should be determined by the appended claim.

What is claimed is:

A cultivating apparatus comprising, a centrally supported frame mounted on a wheeled support, cantilever type end frames pivotally mounted at the ends of said central frame and extending transversely therefrom, said end frames being movable between a position of horizontal alignment with the central frame to a position substantially normal to the central frame, a pair of posts pivotally mounted on the central frame for movement from a position normal thereto to a position inclined thereto, said posts being uniformly spaced intermediate the extent of the central frame, separate cable means connecting each of the cantilever end frames to the posts most remote therefrom such that when the posts are moved from a position substantially normal to the central frame where the cantilever end frames are aligned with the central frame to a position inclined thereto the cantilever end frames are elevated to the position normal to the central frame and the unpivoted extremities of the posts are positioned adjacent one another, a single hydraulic actuator connected respectively at its cylinder and output shaft ends to the posts and being positioned therebetween with the posts being substantially normal to the central frame when the shaft of the hydraulic actuator is in an extended position, said actuator when operated from an extended to a retracted position pivoting the posts simultaneously from a position normal to central frame to an inclined position to raise the cantilever type end frames from a position of alignment with the central frame to a position normal to the central frame, and stop means mounted on each of the cantilever frames and having bifurcated extremities adapted to fit around portions of the central frame to hold and lock the cantilever frames in an elevated position normal to the central frame.

References Cited by the Examiner

UNITED STATES PATENTS

| 2,672,000 | 3/1954 | Speiser | 56—7 |
| 3,146,833 | 9/1964 | Friemel et al. | 172—126 |
| 3,156,306 | 9/1964 | Dunker | 172—456 |

FOREIGN PATENTS

| 602,972 | 8/1960 | Canada. |
| 687,645 | 6/1964 | Canada. |

ABRAHAM G. STONE, *Primary Examiner.*

T. GRAHAM CRAVER, *Examiner.*

J. R. OAKS, *Assistant Examiner.*